United States Patent
Shinozaki et al.

(10) Patent No.: US 6,269,283 B1
(45) Date of Patent: Jul. 31, 2001

(54) MACHINING LIMIT AREA SPECIFYING METHOD AND MANUEL FEED MACHINING METHOD USING NUMERICAL CONTROL UNIT

(75) Inventors: Satoru Shinozaki, Shimodate; Susumu Nagayama, Fujiyoshida, both of (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 09/077,096

(22) PCT Filed: Sep. 19, 1997

(86) PCT No.: PCT/JP97/03325

§ 371 Date: May 19, 1998

§ 102(e) Date: May 19, 1998

(87) PCT Pub. No.: WO98/12018

PCT Pub. Date: Mar. 26, 1998

(30) Foreign Application Priority Data

Sep. 19, 1996 (JP) .................................................. 8-267728

(51) Int. Cl.⁷ ...................................................... G06F 19/00
(52) U.S. Cl. ............................................. 700/172; 700/180
(58) Field of Search ........................................ 700/172, 177, 700/178, 180

(56) References Cited

U.S. PATENT DOCUMENTS

| | | | |
|---|---|---|---|
| 5,095,440 | * | 3/1992 | Suzuki et al. ................ 700/191 |
| 5,107,414 | * | 4/1992 | Fukaya et al. ................ 700/86 |
| 5,136,903 | * | 8/1992 | Hibi ................................ 82/1.11 |
| 5,193,952 | * | 3/1993 | Tomoo et al. ................. 409/80 |
| 5,315,503 | * | 5/1994 | Kato et al. .................... 700/87 |
| 5,377,117 | * | 12/1994 | Yamamoto .................... 700/180 |
| 5,611,032 | * | 3/1997 | Matsuura et al. ............. 707/201 |

FOREIGN PATENT DOCUMENTS

| | | |
|---|---|---|
| 1-97540 | 4/1989 | (JP) . |
| 06019527A | 1/1994 | (JP) . |
| 06-348327 | 12/1994 | (JP) . |
| 08-39395 | 2/1996 | (JP) . |
| 08039395 A | 2/1996 | (JP) . |
| 08-147015 | 6/1996 | (JP) . |
| 08147015 A | 6/1996 | (JP) . |

\* cited by examiner

*Primary Examiner*—William Grant
*Assistant Examiner*—Chad Rapp
(74) *Attorney, Agent, or Firm*—Staas & Halsey LLP (57) ABSTRACT

A machining limit area specifying method and a manual feed machining method using a numerical control unit capable of easily performing machining in a desired shape by manual feed. In specifying a machining limit area on an X-Y plane, a desired machining shape is defined by shaping data or a combination of some shaping data on the X-Y plane at a predetermined Z-coordinate, and the desired machining shape defined by the shaping data is specified as a machining limit area in which movement of a tool is permitted on the X-Y plane in manual machining using the numerical control unit. In specifying a machining limit area in the Z-axis direction, an inverse function using an X- or Y-coordinate value as a parameter is obtained based on a function for specifying the machining limit area on the X-Y plane on condition that a Z-coordinate value is used as a parameter, and the machining limit area in the Z-axis direction is specified based on the inverse function.

19 Claims, 9 Drawing Sheets

MACHINING LIMIT AREA SPECIFYING METHOD AND MANUEL FEED MACHINING METHOD USING NUMERICAL CONTROL UNIT

FIELD OF THE INVENTION

The present invention relates to a method of specifying a machining limit area in which movement of a tool is permitted in manual feed using a numerical control unit, and to a manual feed machining method using the machining limit area.

BACKGROUND OF THE INVENTION

In a numerical control unit for controlling a machine tool such as a general-purpose milling machine and a lathe to perform machining, an automatic operation mode for controlling the machine tool by executing a machining program and a manual feed mode for feeding a tool by manual operation can be selected. In the manual feed mode, it is possible to perform a manual-continuous feed to continuously drive a machine tool by manual operation through jog feed or the like, a fine adjustment feed for driving the machine tool by operating a manual pulse generator, or an increment feed for moving a tool by a predetermined distance each time a switch is depressed.

In case of performing machining in a desired shape by the manual feed as described above, since a conventional numerical control unit is not equipped with means for preventing excessive cutting, interference or the like in the manual operation, it is necessary for an operator to make machining by paying attention to the excessive cutting, interference or the like. In high-speed machining, since machining is performed at high speed, it is particularly necessary to pay attention to the excessive cutting, interference or the like. Thus, machining takes a long time and requires a skill, so that every operator could not perform machining manually with ease.

SUMMARY OF INVENTION

It is an object of the present invention to easily perform machining in a desired shape by the manual feed.

A method of specifying a machining limit area of the present invention comprises the steps of: defining a desired machining shape by shaping data or a combination of the shaping data on an X-Y plane; and specifying a machining limit area in which movement of the tool is permitted in machining, based on the defined machining shape. Further, a manual feed machining method of the present invention utilizes the machining limit area specified by the above specifying method to perform machining by feeding a tool on condition that movement of the tool is limited within the machining limit area.

The machining limit area of the present invention means an area in which the movement of the tool is permitted in machining, and may be specified based on a desired machining shape. The specified machining limit area may include a machining limit area in an X- and/or a Y-axis direction and a machining limit area in a Z-axis direction.

In specifying the machining limit area on the X-Y plane, a desired machining shape is determined by shaping data or a combination of some shaping data on the X-Y plane at a predetermined Z-coordinate, and the desired machining shape determined by the shaping data is specified as a machining limit area in which the tool can be moved on the X-Y plane in manual machining using a numerical control unit. A circular-arc or straight-line may be used as the shaping data to define the shape of the machining limit area.

In the case where the shape on the X-Y plane varies in a Z-axis direction, the shaping data on the X-Y plane may be specified by means of a function using a Z-coordinate value as a parameter. Thus, the machining limit area on the X-Y plane at different Z-coordinate values can be defined by specifying the machining limit area on the X-Y plane by the shaping data according to the above method, and varying the shaping data using the above function using the Z-coordinate value as a parameter. As the result, the shape initially specified on the X-Y plane at the predetermined coordinate position is reduced or enlarged in the Z-axis direction.

In specifying the machining limit area in the Z-axis direction, a desired machining shape is determined by shaping data or a combination of some shaping data on the X-Y plane and a function using the Z-coordinate value as a parameter. Then, this function is converted into an inverse function using an X- or a Y-coordinate value as a parameter, to obtain a function for specifying the Z-coordinate value of the tool with respect to the coordinates of the machining limit area on the X-Y plane.

The specified machining limit area in the Z-axis direction may be set in accordance with the depth of cut, i.e., the maximum depth of cut in the Z-axis direction in one cutting process of the tool. Thus, it is possible to prevent the excessive cutting which may be caused by the alteration of the depth of cut.

Further, in a machining method using a numerical control unit of the present invention, machining is performed by manually feeding a tool in accordance with the specified machining limit area, i.e., the machining limit area in the X- and/or Y-axis direction and/or the machining limit area in the Z-axis direction depending on a direction in which the machining limit area is to be specified.

DESCRIPTION OF THE PREFERRED EMBODIMENTS

First, a description will be given on a numerical control unit 10 to be used for carrying out a method of the present invention and a machine tool controlled by the numerical control unit referring to FIG. 1.

Figure 1:
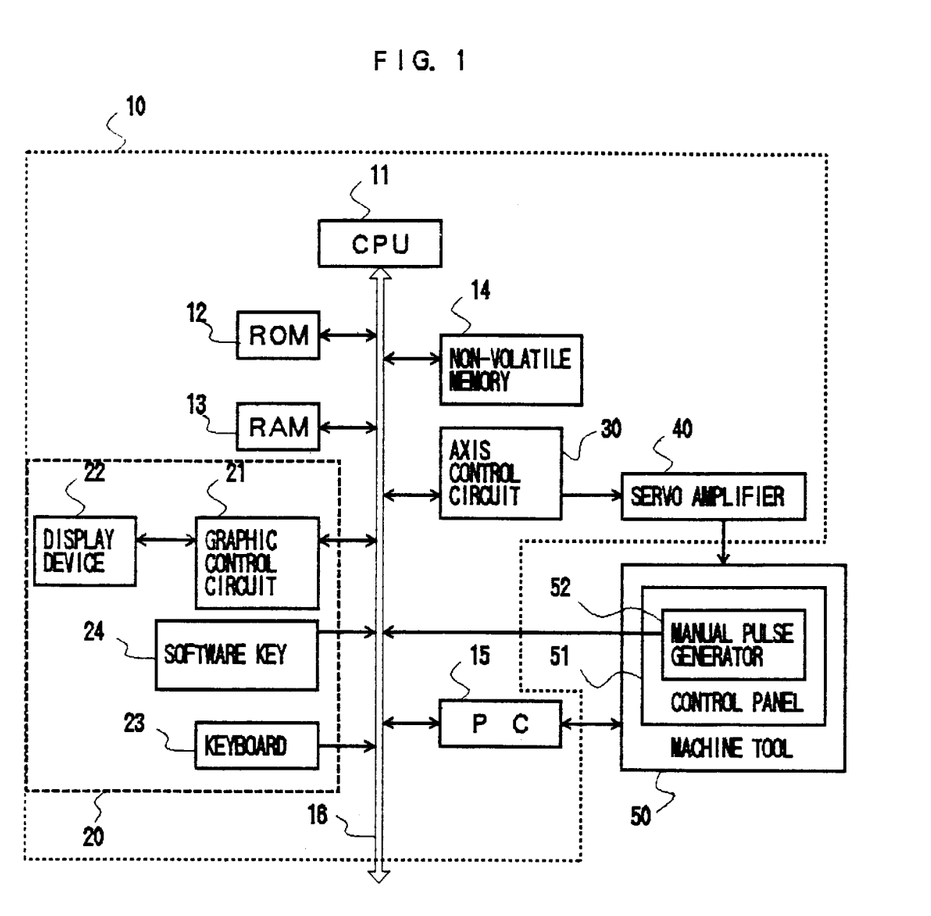
FIG. 1 is a block diagram showing an essential part of a numerical control unit and a machine tool controlled by the numerical control unit for carrying out a method of the present invention.

In FIG. 1, a CPU 11 in a numerical control unit 10 reads out a system program from a ROM 12 through a bus 16, and controls the whole numerical control unit 10 according to the system program. A RAM 13 stores temporary calculation data, display data and various data inputted by an operator through a CRT/MDI unit 20. A non-volatile memory 14 such as a CMOS memory is backed up by a battery (not shown) to retain storage data even if a power source of the numerical control unit 10 is turned off, and stores an NC machining program read through an interface (not shown) or the CRT/MDI unit 20, parameter values necessary for drive controlling a machine tool, etc. Further, various system programs for performing the processing in a data input mode necessary for creating and editing the NC machining program and in a playback mode for automatic operation are preliminarily stored in the ROM 12. In addition, a program for performing the processing of specifying a machining limit area according to the present invention is also stored in the ROM 12.

External devices such as a data input device and an external storage device are connected to an interface (not shown), so that the NC machining program or the like is read through these external devices, and the NC machining program edited in the numerical control unit 10 can be outputted from the numerical control unit 10 to the external devices.

A PC (Programmable Controller) 15 controls auxiliary devices of the machine tool, for instance, an actuator such as a robot hand for exchanging tools according to a sequence program stored in the numerical control unit 10. Thus, the PC 15 performs conversion of signals for the auxiliary devices according to the sequence program and outputs the converted signals to the auxiliary devices of the machine tool through an input/output unit (not shown) in accordance with M function, S-function and T-function commanded by the NC machining program. The auxiliary devices such as actuators are operated in response to the output signals. Further, the PC receives signals from limit switches on a body of the machine tool and the auxiliary devices, and also various switches on a control panel of the machine tool, to perform the necessary processing on the signals and transfer the processed signals to the CPU 11.

Image signals including a current position of each axis of the machine tool, an alarm and image data are sent to the CRT/MDI unit 20, and are displayed on a display device 22 through a graphic control circuit 21. The CRT/MDI unit 20 comprises a manual data input unit with the graphic control circuit 21, the display device 22, a keyboard and various software keys 24, and transfers data to the CPU 11 through the bus 16. Further, a system program for manual programming stored in the ROM 12 may be started to make the display device 22 display an interactive frame so that input of data regarding a shape or the like is permitted for creating a machining program and input of data in an interactive manner. A manual pulse generator 52 can be provided on a control panel of the machine tool 50, for instance, and is used for precious positioning of movable parts of the machine tool by controlling each axis based on distributed pulses according to the manual operation.

An axis control circuit 30 receives a motion command for each axis from the CPU 11 and outputs a command for each axis to a servo amplifier 40. The servo amplifier 40 drives a motor for each axis in accordance with the command. A pulse coder for position detection is built in the servo motor for each axis, and position signals are fed back as a pulse train from the pulse coder. When occasion demands, a linear scale is used as the position detector.

Similarly, with respect to a spindle (not shown) of the machine tool, a spindle control circuit receives a spindle rotation command and outputs a spindle speed signal to a spindle amplifier. The spindle amplifier receives the spindle speed signal and rotates a spindle motor of the machine tool at the commanded speed. A position coder is connected to the spindle motor, and outputs feedback pulses in synchronization with the rotation of the spindle, and the feedback pulses are read by the CPU 11. In addition, in case of positioning the spindle at a predetermined angular position commanded by the machining program, the spindle is stopped and held at the predetermined angular position under positional control of the spindle, i.e., C-axis control by processing of the CPU 11 using a one-rotation signal outputted from the position coder.

The non-volatile memory 14 may be utilized as a parameter memory for storing the specified machining limit area. Further, the non-volatile memory 14 may store functions for defining the machining limit area.

Figure 8:
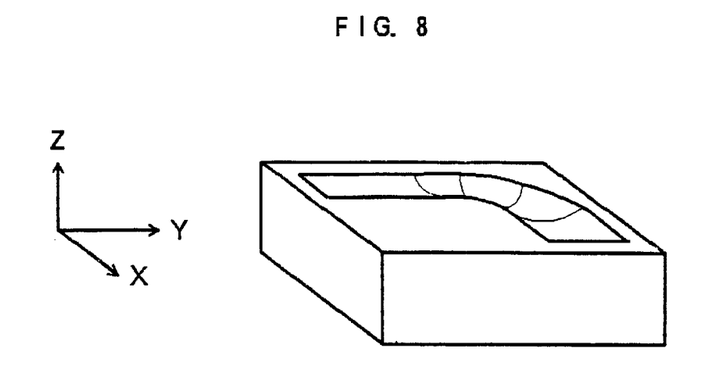
FIG. 8 is a perspective view showing a machining shape defined by circular-arc and straight-line portions.
Figure 9:
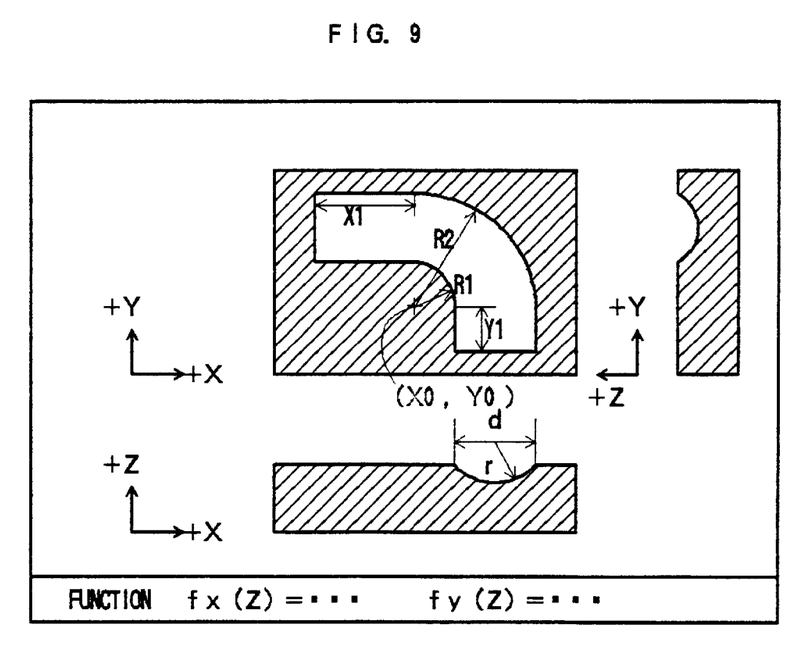
FIG. 9 is a schematic view showing a display screen for specifying a machining limit area based on the machining shape shown in FIG. 8.
Figure 10:
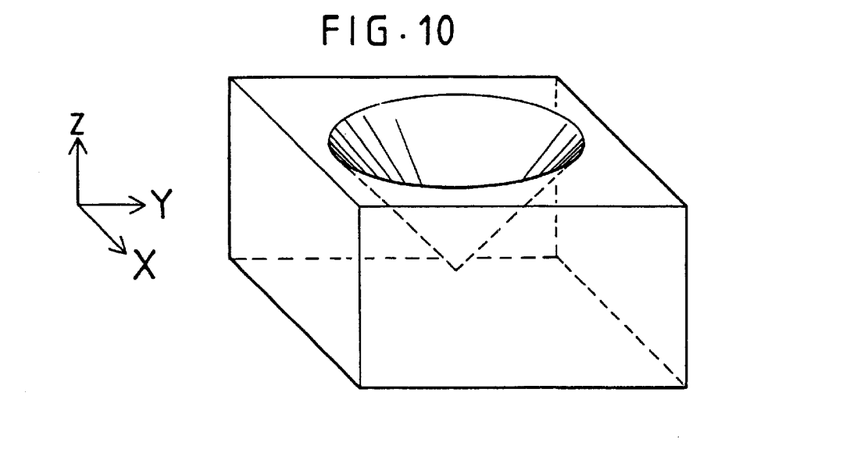
FIG. 10 is a perspective view showing a conical concave machining shape.
Figure 11:
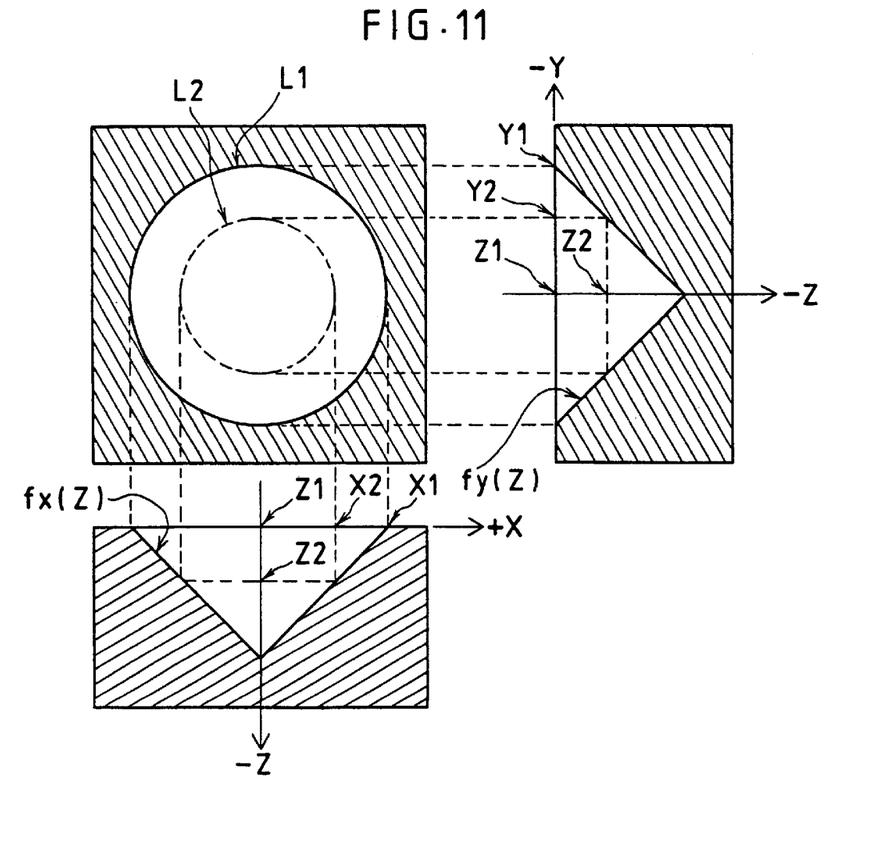
FIG. 11 is a schematic view showing a display screen for specifying a machining limit area based on the machining shape shown in FIG. 10.

A method of specifying a machining limit area for the numerical control unit of the present invention will be described referring to FIGS. 2–11. FIGS. 2–5 show cases of specifying a machining limit area of a convex shape, and FIGS. 6–9 show cases of specifying a machining limit area of a concave shape. Further, FIGS. 10 and 11 show a case of varying a machining limit area on an X-Y plane in accordance with the position on a Z-axis.

Figure 2:
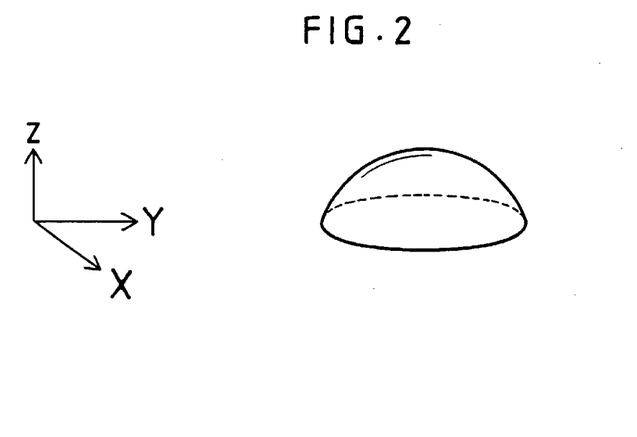
FIG. 2 is a perspective view showing a hemispherical convex machining shape.
Figure 3:
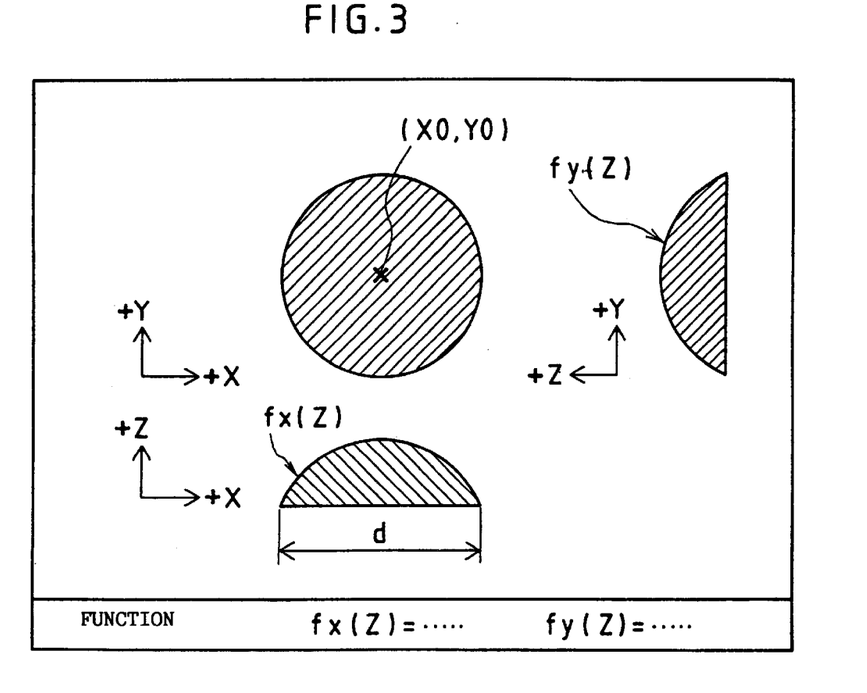
FIG. 3 is a schematic view showing a display screen for specifying a machining limit area based on the machining shape shown in FIG. 2.

A first example is a case of specifying a convex machining limit area on the basis of a hemisphere. As shown in FIG. 2, the hemisphere for specifying a machining limit area has a circular cross section on an X-Y plane and a radius of a circle in the cross section gradually decreases in a Z-axis direction. FIG. 3 shows an example of a displayed image in specifying a machining limit area of a convex shape on the basis of the hemisphere shown in FIG. 2. On the display screen, the machining limit area is specified by shaping data such as circular-arc or straight-line data. In the displayed image shown in FIG. 3, the machining limit area is specified by determining a sectional shape on the X-Y plane and the X-Z or Y-Z plane.

Regarding the X-Y plane, the machining limit area on the X-Y plane is specified by inputting circle data including a center position (X0, Y0) and a radius r at the predetermined Z-coordinate. On the other hand, the displayed image on the X-Z plane shows variation of the length of the machining limit area in the X-axis direction with respect to the Z-axis direction by means of the sectional shape as viewed from the Y-axis direction. The length in the X-axis direction with respect to the Z-axis direction is defined by a function. For instance, this function may be expressed by fx(Z) which is inputted through the input means such as the keyboard 23 in the CRT/MDI unit 20 and stored in the non-volatile memory 14.

The definition using the functions is used for varying the shape on the X-Y plane at the predetermined Z-coordinate with the Z-coordinate value as a parameter. For instance, the X-Z plane in the display screen shows a variation of the length of the machining limit area in the X-axis direction with respect to the Z-axis direction by means of the sectional shape as viewed from the Y-axis direction, and the length in the X-axis direction with respect to the Z-axis direction can be defined by fx(Z) so that the X-coordinate is determined by fx(Z). Further, the Y-Z plane in the display screen shows a variation of the length of the machining limit area in the Y-axis direction with respect to the Z-axis direction by means of the sectional shape as viewed from the X-axis direction, and the length in the Y-axis direction with respect to the Z-axis direction can be defined by fy(Z) so that the Y-coordinate is determined by fy(Z). The functions fx(Z) and fy(Z) may be inputted through the input means such as the keyboard 23 in the CRT/MDI unit 20.

The functions fx(Z) and fy(Z) may be determined as follows. The function A(Z) defines a sectional shape taken perpendicularly to the Y-axis at a desired point on the Y-axis passing through a center of the shape on the X-Y plane. The function fx(Z) may be determined by giving the coordinate of the desired point on the Y-axis for defining the sectional shape. When a desired point on the Y-axis for determining the function fx(Z) is not given, the sectional shape is uniformly defined irrespectively of the position on the Y-axis. Similarly, the function fy(Z) defines a sectional shape taken perpendicularly to the X-axis at a desired point in the X-axis passing through the center of the shape on the X-Y plane.

Thus, the machining limit area of the convex shape can be specified such that the shape determined on the X-Y plane at a certain Z coordinate is varied in accordance with the functions fx(Z) and fy(Z). In the case where a circle is inputted as shaping data on the X-Y plane, enlargement or reduction of a radius in the Z-axis direction may be specified by using either of the functions fx(Z) and fy(Z).

The machining limit area in which a tool can be moved in the Z-axis direction may be determined in accordance with a maximum depth of cut in the Z-axis direction in one cutting process.

A slant-lined portion in FIG. 3 shows a portion in which the movement of the tool is inhibited. That is, the machining limit area is specified as a portion other than the slant-lined portion.

Figure 4:
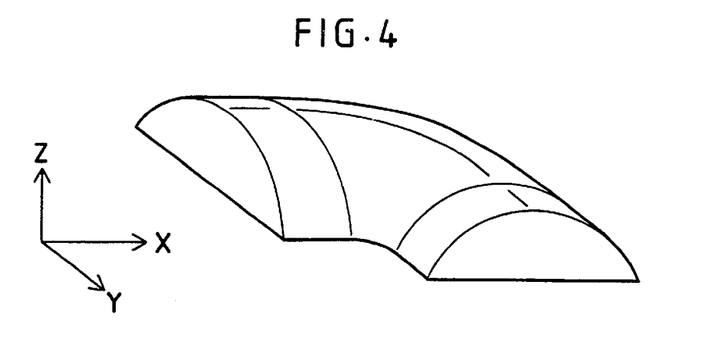
FIG. 4 is a perspective view showing a convex machining shape defined by circular-arc and straight-line portions.
Figure 5:
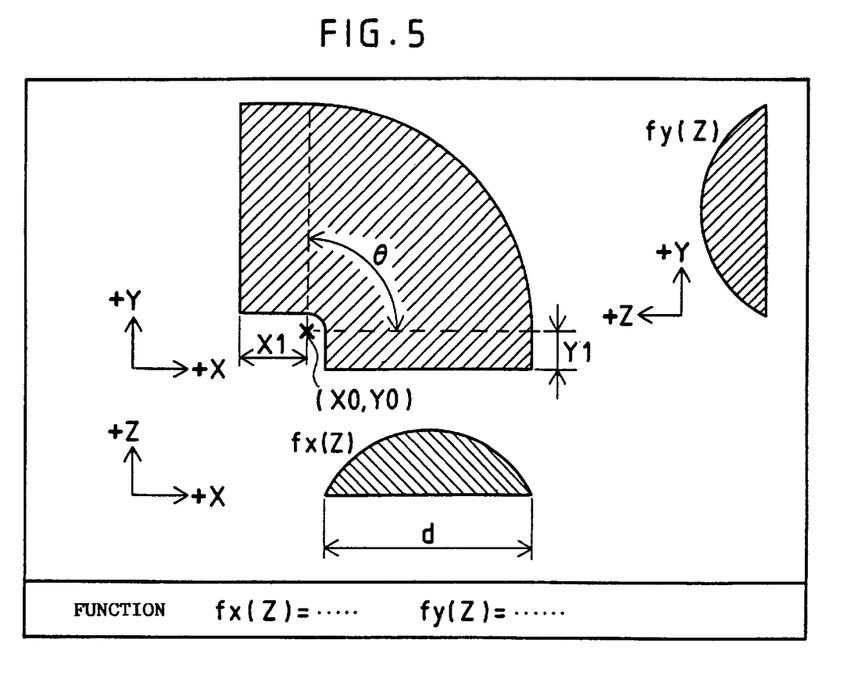
FIG. 5 is a schematic view showing a display screen for specifying a machining limit area based on the machining shape shown in FIG. 5.

A second example is to specify a machining limit area of a convex shape on the basis of a part of a pipe-like shape having a curved portion. As shown in FIG. 4, the shape for specifying the machining limit area has rectangular portions on the opposite ends of a circular-arc portion on the X-Y plane, and a width is decreased in the Z-axis direction. FIG. 5 shows a displayed image in specifying the machining limit area of the convex shape on the basis of the machining shape shown in FIG. 4. On the display screen, the machining limit area is specified on the basis of shaping data such as circular-arc data or straight-line data. In the displayed image shown in FIG. 5, the machining limit area is specified by determining sectional shapes on the X-Y plane and the X-Z or Y-Z plane.

Regarding the X-Y plane, the machining limit area on the X-Y plane is specified by inputting circular-arc data including a center position (X0, Y0), a radius and an open angle θ, etc. and straight-line data (including positions and lengths X1, Y1, etc.) for defining rectangles on the opposite ends of the circular-arc portion in the predetermined Z-coordinate. On the other hand, on the X-Z plane, a variation of the length of the machining limit area on the X-axis direction with respect to the Z-axis direction is shown by means of the sectional shape as viewed from the Y-axis direction. The length on the X-axis direction with respect to the Z-axis direction can be specified by the function fx(Z), similarly to the first example.

On the other hand, the machining limit area in the Z-axis direction may be specified by using the functions in the same manner as in the first example. Thus, the machining limit area of the convex shape is specified such that the shape determined on the X-Y plane at a certain Z-coordinate is varied in accordance with the functions fx(Z) and fy(Z). Incidentally, a slant-lined portion in FIG. 5 shows a portion in which the movement of the tool is inhibited.

Figure 6:
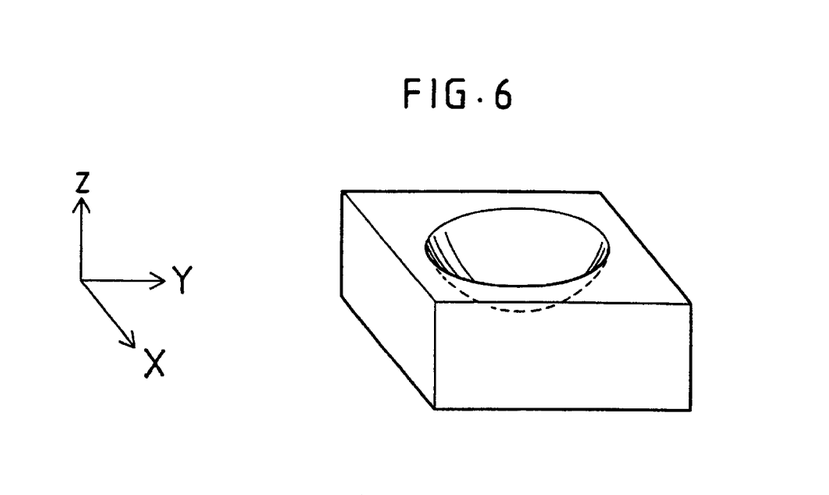
FIG. 6 is a perspective view showing a hemispherical concave machining shape.
Figure 7:
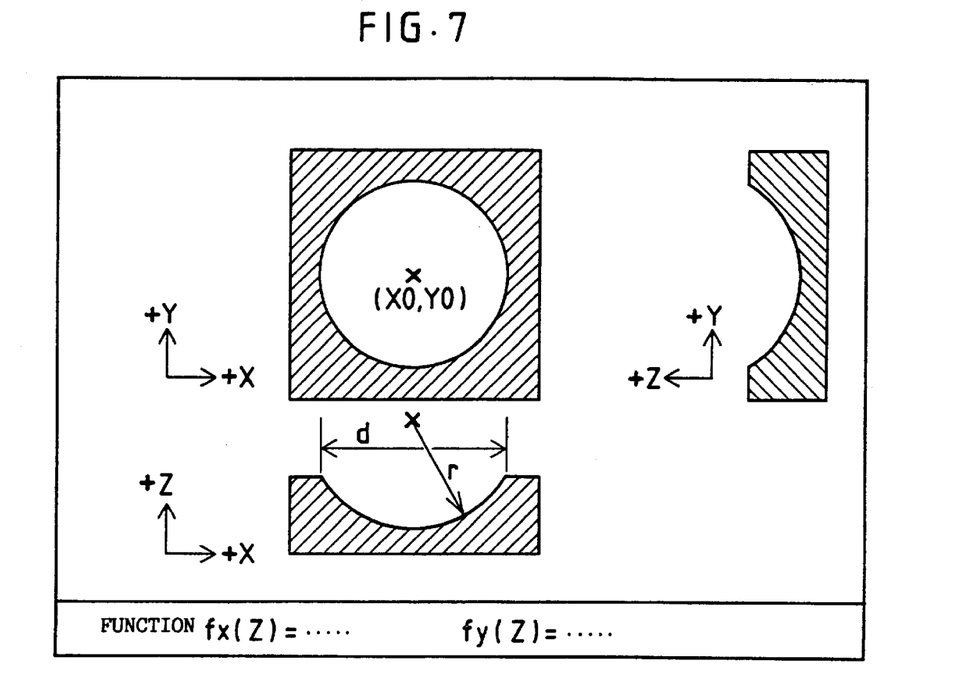
FIG. 7 is a schematic view showing a display screen for specifying a machining limit area based on the machining shape shown in FIG. 6.

A third example is to specify a machining limit area of a concave shape on the basis of a hemispherical machining shape. As shown in FIG. 6, a concave hemisphere for specifying the machining limit area is formed by circles formed in rectangles on the X-Y planes with their radius decreasing in the Z-axis direction. FIG. 7 shows an example of displayed image in specifying the machining limit area of the concave shape on the basis of the hemispherical machining shape shown in FIG. 6. On the display screen, the machining limit area is specified by determining the shape of the rectangular portion using shaping data such as straight-line data, and by determining the concave hemispherical portion using circular-arc data. Further, in the displayed image shown in FIG. 7, the machining limit area is specified by determining the sectional shapes on the X-Y plane and the X-Z or Y-Z plane.

Regarding the X-Y plane, an outer machining limit area is specified by four straight-line data in the predetermined Z-coordinate, while a machining limit area of the circular arc in the concave portion is specified by circular-arc data including a center position (X0, Y0) and a radius r. On the other hand, the displayed image on the X-Z plane shows a variation of the length of the machining limit area in the X-axis direction with respect to the Z-axis direction by means of the sectional shape as viewed from the Y-axis direction, and may be specified by the straight-line data and the circular-arc data or the function fx(Z). Similarly, the displayed image in the Y-Z plane shows a variation of the length of the machining limit area in the X-axis direction to the Z-axis direction by means of the sectional shape as viewed from the X-axis direction, and may be specified by the straight line data and the circular-arc data or the function fy(Z).

The machining limit area in the Z-axis direction may be also specified by using the function, similarly to the first and second embodiments. Thus, the machining limit area of the concave shape can be specified such that the shape determined on the X-Y plane at a certain predetermined Z-coordinate is varied in accordance with the functions fx(Z) and fy(Z). Incidentally, a slant-lined portion in FIG. 7 shows a portion in which the movement of the tool is inhibited.

A fourth example is to specify a machining limit area of a concave shape on the basis of a part of a pipe-like machining shape having a curved portion. As shown in FIG. 8, the shape for specifying the machining limit area has a concave portion in a rectangular parallelepiped and has rectangles on the opposite ends of a circular-arc portion on the X-Y plane with its width decreasing in the Z-axis direction. FIG. 9 shows an example of a displayed image in specifying the machining limit area having the concave portion on the basis of the machining shape shown in FIG. 7. On the display screen, the machining limit area is specified by determining the shape of the rectangular portion by shaping data such as straight-line data, and by determining the shape of the concave portion by circular-arc data and straight-line data. Further, in the displayed image shown in FIG. 9, the machining limit area is specified by determining the sectional shapes on the X-Y plane and the X-Z or Y-Z plane.

Regarding the X-Y plane, an outside machining limit area of the rectangular shape is specified using four straight-line data in the predetermined Z-coordinate, while the concave portion is specified using the circular-arc data including a center position (X0, Y0), radii R1, R2 and an open angle θ and straight-line data inside the rectangular portion. On the other hand, the displayed image on the X-Z plane shows a variation of the length of the machining limit area in the X-axis direction with respect to the Z-axis direction by means of the sectional shape as viewed from the Y-axis direction, and may be specified by the straight line data and the circular-arc data or the function fx(Z). Similarly, the displayed image on the Y-Z plane shows a variation of the length of the machining limit area in the Y-axis direction with respect to the Z-axis direction by means of the sectional shape as viewed from the X-axis direction, and may be specified by the straight-line data and the circular-arc data or the function fy(Z).

On the other hand, the machining limit area in the Z-axis direction may be specified by using the function, similarly to the above first, second and third example. Thus, the machining limit area of the concave shape may be specified such that the shape determined on the X-Y plane in the certain Z-coordinate varies in accordance with the functions fx(Z) and fy(Z). Incidentally, a slant-lined portion in FIG. 9 shows a portion in which the movement of the tool is inhibited.

A description will be made on the variation of the shape on the X-Y plane with respect to the Z-coordinate using the functions, referring to FIGS. 10 and 11. In this example, the description will be given on a case where a concave portion of a conical shape is specified as the machining limit area, as shown in FIG. 10.

With respect to the concave machining limit area of the conical shape shown in FIG. 10, the shape on the X-Y plane in the predetermined Z-coordinate can be specified by circle data shown in FIG. 11, similarly to the above example, and a slant-lined portion shows a portion in which the movement of the tool is inhibited. In FIG. 11, the displayed image on the X-Z or Y-Z plane shows a variation of the machining limit area in the Z-axis direction. The following description is made with respect to the X-Z plane. The displayed image on the X-Z plane shows a section as viewed from the Y-axis direction which indicates a boundary of the machining limit area in the X-axis direction with respect to the Z-axis direction. In the example shown in FIG. 11, the boundary is defined by a straight line between (X1, Z1) and (0, Zn) and a straight line between (−X1, Z1) and (0, Zn). The boundary can be specified by shaping date of straight lines or circular arcs, or otherwise, by a function fx(Z) using the Z-coordinate value as a parameter, which represents the relationship between the Z-coordinate and X-coordinate, if it is not specified by the above shaping data.

In the case where the machining limit area is symmetrical about the Z-axis, the machining limit area can be specified by either the first quadrant or the second quadrant.

The machining limit area may be also specified on the Y-Z plane by the process similar to that on the X-Z plane, and hence the description thereof will be omitted.

Further, when the machining limit area is symmetrical about the Z-axis, it is possible to specify this machining limit area only by either of the X-Z plane and the Y-Z plane.

Accordingly, by determining the machining limit area on the X-Y plane at a certain predetermined Z-coordinate position and the function fx(Z) is defined with respect to the machining limit area, the machining limit area with respect to a position in the Z-axis can be specified. For instance, in the case where a machining limit area of a circle L1 on the X-Y plane at the Z-coordinate value of Z1 is specified and the function x(Z) is defined with respect to the machining limit area, it is possible to specify a machining limit area of a circle L2 on the X-Y plane at the Z-coordinate value of Z2, by obtaining a function value fx(Z2) of the Z-coordinate value of Z2.

In the example shown in FIG. 11, the function fx(Z) represents straight lines, however, an arbitrary function may be used for defining the machining limit area.

Figure 14:
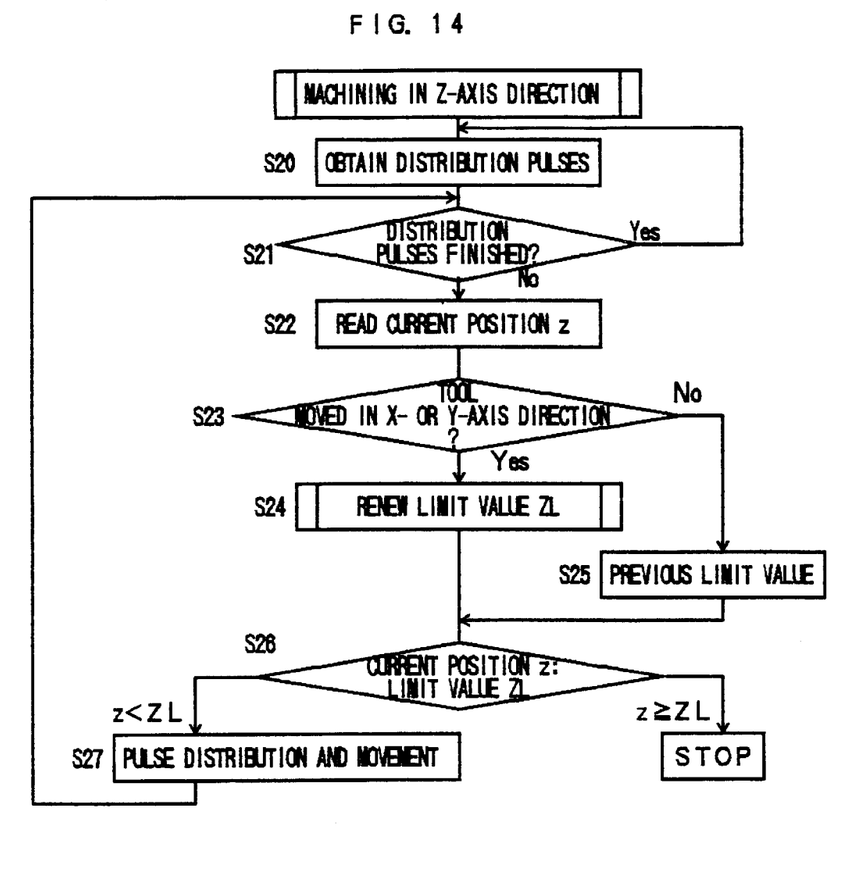
FIG. 14 is a flow chart showing the processing for machining in a Z-axis direction according to the machining method of the present invention.
Figure 15:
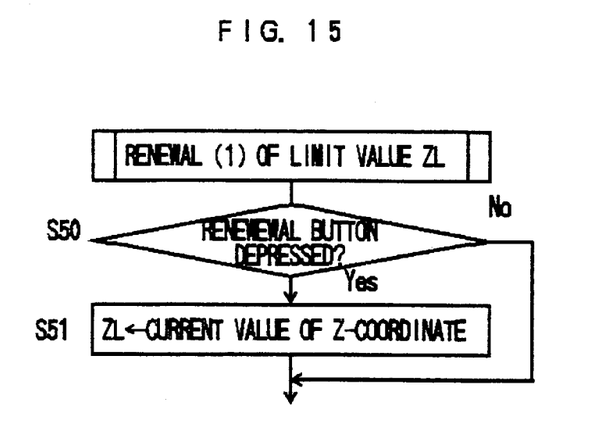
FIG. 15 is a flow chart showing the processing for renewing a machining limit value.
Figure 16:
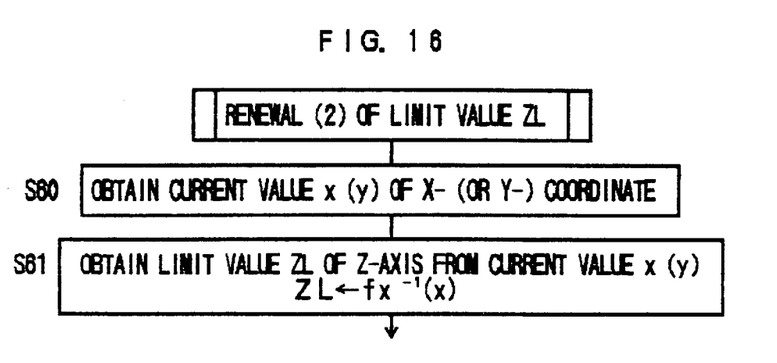
FIG. 16 is a flow chart showing the different processing for renewing a machining limit value.

A description will be made on a machining method of performing machining by manually feeding a tool using the specified machining limit area. Since machining by manual feed is performed with respect to every each axis of the X-, Y- and Z-axes, machining operation on every each axis will be described. As machining in the X-axis direction is same as that in the Y-axis direction, machining in the X-axis direction will be only described, referring to FIGS. 12 and 13, while a description of machining in the Y-axis direction will be omitted. Further, machining in the Z-axis direction will be described referring to FIGS. 14 to 16. FIGS. 15 and 16 show machining with alteration of the machining limit area in the Z-axis direction.

Figure 12:
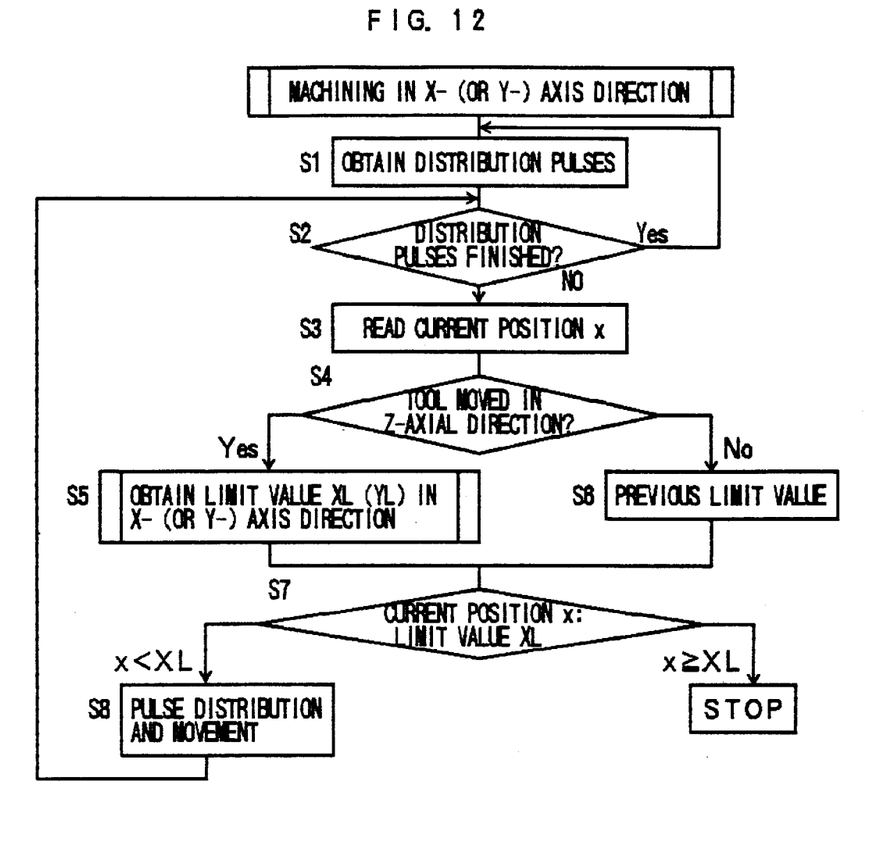
FIG 12 is a flow chart showing the processing for machining in an X-axis direction according to a machining method of the present invention.
Figure 13:
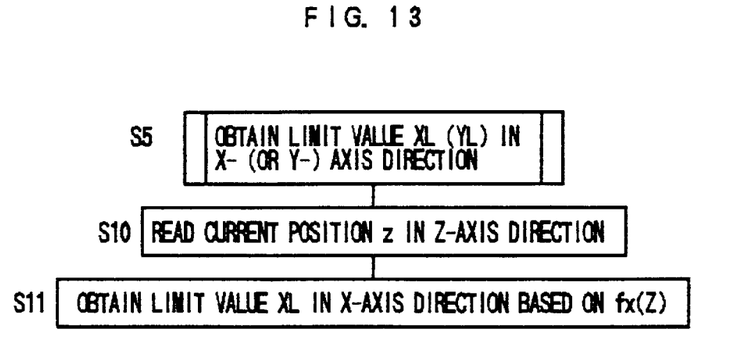
FIG. 13 is a flow chart showing the processing for obtaining a limit value in an X-axis direction.

First, a description will be made on machining in the X-axis direction using FIGS. 12 and 13. In machining in the X-axis direction, distribution pulses to be supplied to the axis control circuit 30 are obtained. The distribution pulses can be generated by driving the manual pulse generator 52. The numerical control unit 10 performs the axis driving on the basis of the distribution pulse (Step S1).

The numerical control unit 10 reads a current position x of the tool step S3), obtains a limit value XL in the X-axis direction through the processing in the following Steps S4 to S6, and compares the current position x with the limit value XL in the X-axis direction (Step S7).

When the current position x of the tool does not reach the limit value XL in the X-axis direction, the pulse distribution is performed to move the tool in the X-axis direction (Step S8). The tool is moved continuously until it is determined in the comparison processing in the Step S7 that the current position x of the tool reaches the limit value XL in the X-axis direction, i.e., the tool reaches the machining limit area, or the distribution pulses are finished in Step S2.

As to the limit value XL in the X-axis direction, it is determined whether or not the tool is moved in the Z-axis direction (Step S4), and when it is determined that the tool is moved in the Z-axis direction, a new limit value XL is obtained in Step S5. As shown in FIG. 13, in the processing of Step S5, a current position z of the tool in the Z-axis direction is read (Step S10) and a new limit value XL in the X-axis direction is obtained through arithmetic operation of substituting the current position z for the parameter Z of the function A(Z) (Step S11). When it is determined that the tool is not moved in the Z-axis direction, the previous limit value XL in the X-axis direction is used (Step S6). When distribution pulses are newly generated by further driving the manual pulse generator 52, the above operation is repeatedly performed.

A description will be made on machining in the Z-axis direction using FIG. 14. In machining in the Z-axis direction, distribution pulses to be supplied to the axis control circuit 30 are obtained by driving the manual pulse generator 52. The numerical control unit 10 performs the axis driving on the basis of the distribution pulses (Step S20).

The numerical control unit 10 reads a current position z of the tool (Step S22), obtains a limit value ZL in the Z-axis direction through the processing of the following Steps S23 to S25, and compares the current position z with the limit value ZL in the Z-axis direction (Step S26).

When the current position z of the tool does not reach the limit value ZL in the Z-axis direction, the pulse distribution is performed to move the tool in the Z-axis direction (Step S27). The tool is moved continuously until it is determined in the comparison processing in Step S24 that the current position z of the tool reaches the limit value ZL in the Z-axis direction, i.e., the tool reaches the machining limit area, or the distribution pulses are finished in Step S21.

As to the limit value ZL in the Z-axis direction, it is determined whether or not the tool is moved in the X- or Y-axis direction (Step S23), and when it is determined that the tool is moved in the X- or Y-axis direction, a new limited value ZL is obtained in Step S24. As shown in FIG. 16, in the processing in Step 24, a current value X or Y of the X- or 20 Y-coordinate of the tool is obtained (Step S60), and an inverse function $fx^{-1}(X)$ or $fy^{-1}(Y)$ using X or Y as a parameter is obtained in advance based on the function f(Z) or fy(Z) with the Z-coordinate value as a parameter, and a new limit value ZL in the Z-axis direction is obtained by substituting the current position X or Y for the inverse function (Step S61). When it is determined that the tool is not moved in the X- or Y-axis direction, the previous limit value ZL in the Z-axis direction is used (Step S25).

The limit value ZL in the Z-axis direction can be altered in the course of machining in the Z-axis direction. An example of renewing the limit value will be described referring to FIG. 15. In FIG. 15, a current position Z of the tool is set as the limit value ZL in the Z-axis direction. The renewal is performed by depressing a renewal button or the like, when an operator has manually moved the tool by a cutting depth in the Z-axis direction and desires to set the current position of the tool as the limit value ZL.

When the distribution pulses are newly generated by further driving the manual pulse generator 52, the above operation is repeatedly performed.

As has been described heretofore, according to the present invention, machining of a desired shape by the manual feed operation can be performed easily using the numerical control unit.

What is claimed is:

1. A method of specifying a machining limit area in machining a workpiece by manually feeding a tool relative to the workpiece using a numerical control unit, comprising:

defining a desired machining shape by shaping data or a combination of the shaping data on an X-Y plane; and specifying a machining limit area in which movement of the tool is permitted in machining, based on the machining shape defined in said defining, wherein said defining includes specifying said shaping data on the X-Y plane by a function using a Z-coordinate value as a parameter, and the machining limit area on the X-Y plane in said defining is variable in accordance with said function.

2. A method of specifying a machining limit area according to claim 1, wherein said defining includes converting said function into an inverse function using an X- or Y-coordinate value as a parameter, and specifying the machining limit area in which movement of the tool is permitted in the Z-axis direction, based on said inverse function.

3. The method of specifying a machining limit area according to claim 1, wherein said defining includes defining said machining shape by a circular-arc and/or a straight line.

4. A method of specifying a machining limit area in machining a workpiece by manually feeding a tool relative to the workpiece using a numerical control unit, comprising:

defining a desired machining shape by shaping data or a combination of the shaping data on an X-Y plane; and specifying a machining limit area in which movement of the tool is permitted in machining, based on the machining shape defined in said defining, wherein said specifying further includes setting a machining limit area in which movement of the tool is permitted in the Z-axis direction in accordance with the maximum depth of cut in the Z-axis direction in one cutting process.

5. The method of specifying a machining limit area according to claim 4, wherein said defining includes defining said machining shape by a circular-arc and/or a straight line.

6. A method of machining a workpiece by manually feeding a tool relative to the workpiece using a numerical control unit, comprising:

defining a desired machining shape by shaping data on an X-Y plane;

specifying a machining limit area in which movement of the tool is permitted in machining, based on the machining shape defined in said defining; and performing machining by feeding the tool on condition that the movement of the tool is limited within said machining limit area, wherein said defining includes specifying said shaping data on the X-Y plane by a function using a Z-coordinate value as a parameter, and the machining limit area on the X-Y plane in said defining is variable in accordance with said function.

7. The method of specifying a machining limit area according to claim 6, wherein said defining includes defining said machining shape by a circular-arc and/or a straight line.

8. A method of machining a workpiece by manually feeding a tool relative to the workpiece using a numerical control unit, comprising:

defining a desired machining shape by shaping data on an X-Y plane;

specifying a machining limit area in the X- and/or Y-axis direction in which movement of the tool is permitted in machining, based on the machining shape defined in said defining;

specifying a machining limit area in which movement of the tool is permitted in a Z-axis direction;

performing machining on the X-Y plane by feeding the tool on condition that the movement of the tool is limited within said machining limit area in the X- and/or Y-axis direction; and performing machining in the Z-axis direction by feeding the tool on condition that the movement of the tool is limited within said machining limit area in the Z-axis direction, wherein said defining includes specifying said shaping data on the X-Y plane by a function using a Z-coordinate value as a parameter, and the machining limit area on the X-Y plane in said defining is variable in accordance with said function.

9. The method of specifying a machining limit area according to claim 8, wherein said defining includes defining said machining shape by a circular-arc and/or a straight line.

10. A computer readable storage medium, storing a computer program instructing a computer to perform:

defining a desired three-dimensional machining shape by shaping data on an X-Y-Z plane; and specifying a machining limit area in which movement of a tool is permitted in machining, based on the machining shape defined in said defining, wherein said defining includes specifying said shaping data on the X-Y plane by a function using a Z-coordinate value as a parameter, and the machining limit area on the X-Y plane in said defining is variable in accordance with said function.

11. The computer readable storage medium recited in claim 10, wherein said defining includes converting said function into an inverse function using an X- or Y-coordinate value as a parameter, and specifying the machining limit area in which movement of the tool is permitted in the Z-axis direction, based on said inverse function.

12. The computer readable storage medium according to claim 10, wherein said defining includes defining said machining shape by a circular-arc and/or a straight line.

13. A computer readable storage medium, storing a computer program instructing a computer to perform:

defining a desired three-dimensional machining shape by shaping data on an X-Y-Z plane; and specifying a machining limit area in which movement of a tool is permitted in machining, based on the machining shape defined in said defining, wherein said specifying further includes setting a machining limit area in which movement of the tool is permitted in the Z-axis direction in accordance with the maximum depth of cut in the Z-axis direction in one cutting process.

14. The computer readable storage medium according to claim 13, wherein said defining includes defining said machining shape by a circular-arc and/or a straight line.

15. An apparatus comprising:

a defining unit defining a desired three-dimensional machining shape by shaping data on an X-Y-Z plane; and a prohibition unit prohibiting movement of a tool in a limit area based on the machining shape defined in said defining, wherein said defining unit specifies said shaping data on the X-Y plane by a function using a Z-coordinate value as a parameter, and the machining limit area on the X-Y plane in said defining is variable in accordance with said function.

16. The apparatus recited in claim 15, wherein said defining unit converts said function into an inverse function using an X- or Y-coordinate value as a parameter, and specifying the machining limit area in which movement of the tool is permitted in the Z-axis direction, based on said inverse function.

17. The apparatus according to claim 15, wherein said defining includes defining said machining shape by a circular-arc and/or a straight line.

18. An apparatus comprising:

a defining unit defining a desired three-dimensional machining shape by shaping data on an X-Y-Z plane; and a prohibition unit prohibiting movement of a tool in a limit area based on the machining shape defined in said defining, wherein said specifying unit sets a machining limit area in which movement of the tool is permitted in the Z-axis direction in accordance with the maximum depth of cut in the Z-axis direction in one cutting process.

19. The apparatus according to claim 18, wherein said defining includes defining said machining shape by a circular-arc and/or a straight line.

* * * * *

UNITED STATES PATENT AND TRADEMARK OFFICE
CERTIFICATE OF CORRECTION

PATENT NO. : 6,269,283 B1
DATED : July 31, 2001
INVENTOR(S) : Satoru Shinozaki et al.

It is certified that error appears in the above-identified patent and that said Letters Patent is hereby corrected as shown below:

Title page,
Item [54], change "Manuel" to -- Manual --.

Column 1,
Line 2, change "Manuel" to -- Manual --.

Column 5,
Line 30, change "A(Z)" to -- fx(Z) --.

Column 8,
Line 21, change "X(Z)" to -- fx(Z) --.
Line 21, change "step 53)" to -- (step 53) --.

Column 9,
Line 5, change "A(Z)" to -- fx(Z) --.
Line 37, delete [20].
Line 39, change "f(Z)" to -- fx(Z) --.

Signed and Sealed this

Twenty-sixth Day of February, 2002

Attest:

JAMES E. ROGAN
Attesting Officer
Director of the United States Patent and Trademark Office